United States Patent
Bao et al.

(10) Patent No.: US 12,363,754 B2
(45) Date of Patent: Jul. 15, 2025

(54) RANDOM ACCESS METHOD, TERMINAL DEVICE AND NETWORK SIDE DEVICE

(71) Applicant: VIVO MOBILE COMMUNICATION CO., LTD., Guangdong (CN)

(72) Inventors: Wei Bao, Dongguan (CN); Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 859 days.

(21) Appl. No.: 17/126,704

(22) Filed: Dec. 18, 2020

(65) Prior Publication Data

US 2021/0112604 A1  Apr. 15, 2021

Related U.S. Application Data

(63) Continuation of application No. PCT/CN2019/091698, filed on Jun. 18, 2019.

(30) Foreign Application Priority Data

Jun. 21, 2018 (CN) .......................... 201810646114.1

(51) Int. Cl.
*H04W 74/0833* (2024.01)
*H04W 74/04* (2009.01)

(52) U.S. Cl.
CPC ....... *H04W 74/0833* (2013.01); *H04W 74/04* (2013.01)

(58) Field of Classification Search
CPC .............. H04W 74/0833; H04W 74/04; H04W 74/0808
See application file for complete search history.

(56) References Cited

U.S. PATENT DOCUMENTS

2013/0242730 A1   9/2013  Pelletier et al.
2016/0105913 A1   4/2016  Hakola et al.
(Continued)

FOREIGN PATENT DOCUMENTS

CN     104186010 A    12/2014
CN     107517501 A    12/2017
(Continued)

OTHER PUBLICATIONS

Supplementary Partial European Search Report regarding International Patent Application No. 19821945.3-1215/3799508, PCT/CN2019/091698, dated Jul. 6, 2021.
(Continued)

*Primary Examiner* — Chuong M Nguyen
(74) *Attorney, Agent, or Firm* — Harness, Dickey & Pierce, P.L.C.

(57) ABSTRACT

A random access method includes: performing listen before talk (LBT) operations on LBT frequency bands corresponding to N physical random access channel occasion (RO) resources; and selecting M target RO resources from the N RO resources, at least two RO resources in the N RO resources being corresponding to different LBT frequency bands, the target RO resources being RO resources in the N RO resources at which LBTs are successful, N being an integer greater than 1, and M being an integer less than or equal to N and greater than or equal to 1; and sending preambles by using the M target RO resources.

20 Claims, 6 Drawing Sheets

A CFRA resource configuration is sent to the terminal device, and the CFRA resource configuration includes one or at least two RO resources — 801

(56) References Cited

U.S. PATENT DOCUMENTS

| | | | |
|---|---|---|---|
| 2019/0098661 A1* | 3/2019 | Ye | H04W 74/06 |
| 2019/0124687 A1* | 4/2019 | Yang | H04L 25/0226 |
| 2019/0223255 A1* | 7/2019 | Jeon | H04W 88/023 |
| 2019/0254071 A1* | 8/2019 | Park | H04W 74/006 |
| 2019/0387546 A1* | 12/2019 | Li | H04L 27/26025 |
| 2020/0028766 A1 | 1/2020 | Yu et al. | |

FOREIGN PATENT DOCUMENTS

| | | |
|---|---|---|
| CN | 108112090 A | 6/2018 |
| EP | 3397012 A1 | 10/2018 |
| WO | WO-2015190959 A1 | 12/2015 |
| WO | WO-2017110962 A1 | 6/2017 |
| WO | WO-2017171999 A1 | 10/2017 |
| WO | WO-2018064367 A1 | 4/2018 |

OTHER PUBLICATIONS

First Office Action regarding Chinese Patent Application No. 201810646114.1, dated Dec. 16, 2020. Translation provided by Bohui Intellectual Property.

International Search Report and Written Opinion regarding International Patent Application No. PCT/CN2019/091698, dated Sep. 19, 2019. Translation provided by Bohui Intellectual Property.

Interdigital Communications, "2-Step Random Access Procedure, R1-170073," 3GPP TSG RAN WG1 AH_NR Meeting, Jan. 9, 2017.

* cited by examiner

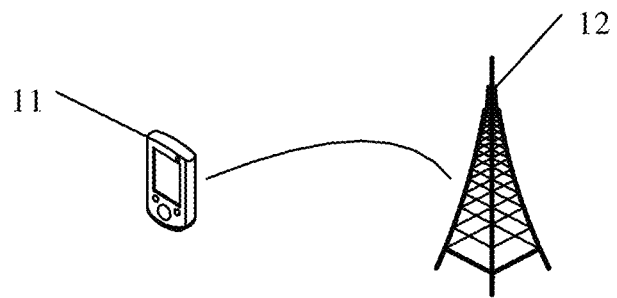

FIG. 5

```
┌─────────────────────────────────────────────────────────────┐
│ The LBT operations are performed on the LBT frequency bands │
│ corresponding to N RO resources, and M target RO resources  │──── 601
│            are selected from the N RO resources             │
└─────────────────────────────────────────────────────────────┘
                              │
                              ▼
┌─────────────────────────────────────────────────────────────┐
│   The preambles are sent by using the M target RO resources │──── 602
└─────────────────────────────────────────────────────────────┘
```

FIG. 6

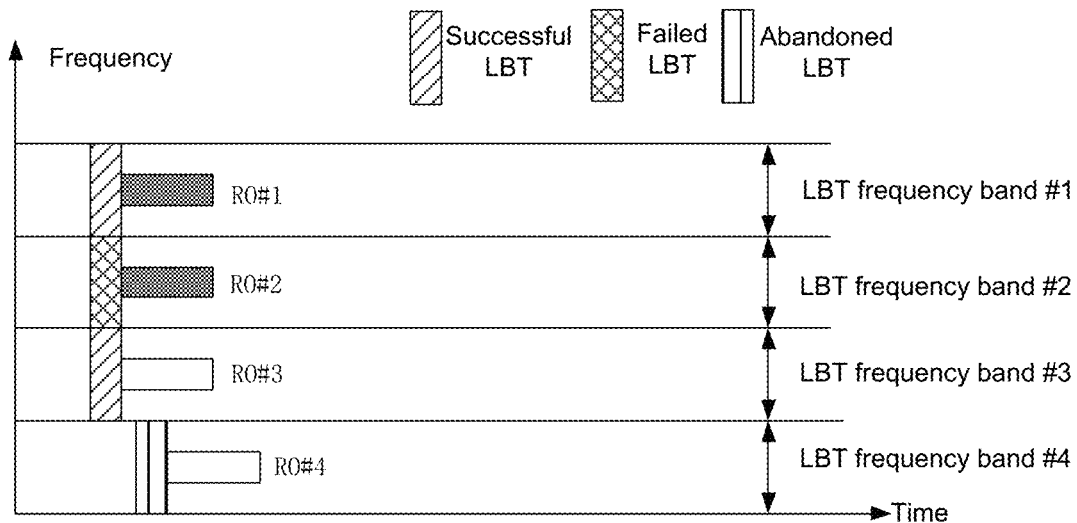
FIG. 7
A CFRA resource configuration is sent to the terminal device, and the CFRA resource configuration includes one or at least two RO resources  ⌐801
FIG. 8
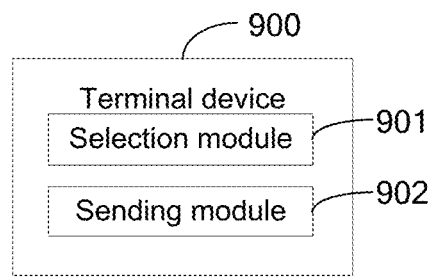
FIG. 9

RANDOM ACCESS METHOD, TERMINAL DEVICE AND NETWORK SIDE DEVICE

CROSS-REFERENCE TO RELATED APPLICATIONS

This application is a Bypass Continuation Application of PCT/CN2019/091698 filed on Jun. 18 2019, which claims priority to Chinese Patent Application No. 201810646114.1 filed on Jun. 21, 2018, the entirety of each is incorporated herein by reference.

TECHNICAL FIELD

The present disclosure relates to the field of communications technologies, and in particular, to a random access method, a terminal device, and a network side device.

BACKGROUND

In future communication systems, unlicensed bands may be used as supplements to licensed bands to help an operator expand services.

SUMMARY

In a first aspect, some embodiments of the present disclosure provide a random access method. The method includes:
performing listen before talk (LBT) operations on LBT frequency bands corresponding to N physical random access channel occasion (RO) resources, and selecting M target RO resources from the N RO resources, wherein at least two RO resources in the N RO resources are corresponding to different LBT frequency bands, the target RO resources are RO resources in the N RO resources at which LBTs are successful, N is an integer greater than 1, and M is an integer less than or equal to N and greater than or equal to 1; and
sending preambles by using the M target RO resources.

In a second aspect, some embodiments of the present disclosure further provide a random access method. The method includes:
sending a contention-free random access (CFRA) resource configuration to a terminal device, wherein the CFRA resource configuration includes one or at least two physical random access channel occasion (RO) resources.

In a third aspect, some embodiments of the present disclosure further provide a terminal device. The terminal device includes:
a processor, configured used to perform listen before talk (LBT) operations on LBT frequency bands corresponding to N physical random access channel occasion (RO) resources, and select M target RO resources from the N RO resources, wherein at least two RO resources in the N RO resources are corresponding to different LBT frequency bands, the target RO resources are RO resources in the N RO resources on which LBTs are successful, N is an integer greater than 1, and M is an integer less than or equal to N and greater than or equal to 1; and
a radio frequency unit, configured to send preambles by using the M target RO resources.

In a fourth aspect, some embodiments of the present disclosure further provide a network side device. The network side device includes:
a transceiver, configured to send a contention-free random access (CFRA) resource configuration to a terminal device, wherein the CFRA resource configuration includes one or at least two physical random access channel occasion (RO) resources.

In a fifth aspect, some embodiments of the present disclosure further provide a non-transitory computer-readable storage medium. The non-transitory computer-readable storage medium stores programs that, when executed by a processor, cause the processor to perform steps of the random access method provided in the first aspect, or cause the processor to perform steps of the random access method provided in the second aspect.

BRIEF DESCRIPTION OF THE DRAWINGS

In order to describe technical solutions in some embodiments of the present disclosure more clearly, accompanying drawings to be used in the description of some embodiments of the present disclosure will be briefly introduced below. Obviously, the accompanying drawings in the following description are merely some embodiments of the present disclosure, and a person of ordinary skill in the art may obtain other drawings according to these drawings without paying any creative effort.

FIG. 5 is a structural diagram of a network system to which some embodiments of the present disclosure may be applied;

FIG. 6 is a flow diagram of a random access method, in accordance with some embodiments of the present disclosure;

FIG. 7 is a schematic diagram of performing LBT operations on LBT frequency bands corresponding to RO resources, in accordance with some embodiments of the present disclosure;

FIG. 8 is a flow diagram of a random access method, in accordance with some embodiments of the present disclosure;

FIG. 9 is a structural diagram of a terminal device, in accordance with some embodiments of the present disclosure;

DETAILED DESCRIPTION

Figure 1:
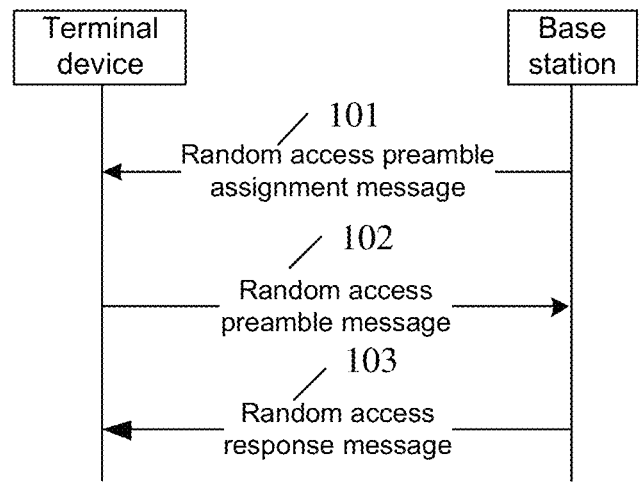
FIG. 1 is a flow diagram of a contention-free random access procedure, in accordance with some embodiments of the present disclosure.

Technical solutions in the embodiments of the present disclosure will be described below clearly and completely with reference to the accompanying drawings in the embodiments of the present disclosure. Obviously, the described embodiments are merely some but not all embodiments of the present disclosure. All other embodiments obtained on a basis of the embodiments of the present disclosure by a person of ordinary skill in the art without paying any creative effort shall be included in the protection scope of the present disclosure.

The terms such as "first" and "second" in the description and the claims of the present disclosure are used for distinguishing similar objects and not necessarily for describing a particular order or sequence. It will be understood that, the terms used as so may be interchanged under appropriate circumstances, so that the embodiments of the present disclosure described herein may be implemented, for example, in sequences other than those illustrated or described herein. Moreover, the terms such as "comprise", "has" and any variations thereof, are intended to cover non-exclusive inclusions. For example, a process, method, system, product, or device that comprises a series of steps or units is not necessarily limited to those steps or units expressly listed, but may include other steps or units that are not expressly listed or inherent to the process, method, product, or device. Further, the term "and/or" is used in the description and the claims to indicate at least one of the objects involved in the term. For example, the phrase "A and/or B and/or C" means the following seven cases: including A alone, including B alone, including C alone, including both A and B, including both B and C, including both A and C, and including A, B and C.

Since the unlicensed bands are shared by various radio access technologies (abbreviated as RATs), such as Wi-Fi, radar, and long term evolution-license assisted access (abbreviated as LTE-LAA), the unlicensed bands must meet rules when used, such as listen before talk (abbreviated as LBT) and maximum channel occupancy time (abbreviated as MCOT), to ensure that all devices may fairly use the resource. The LBT means that a transmitting terminal operating in an unlicensed band needs to monitor whether the frequency band (for example, the frequency band may be identified by a center frequency and a bandwidth) is occupied before transmitting a signal, and if the frequency band is not occupied, the transmitting terminal may transmit a signal on the frequency band.

However, in a random access procedure in the related art, for a base station, a user equipment (abbreviated as UE) is not allowed to simultaneously initiate multiple parallel random access (abbreviated as RA) procedures. When the UE prepares to send Msg1 at a specific physical random access channel occasion (abbreviated as RO) resource, due to an LBT failure of the UE (i.e., the channel being occupied by other sending devices), the UE must delay the sending of Msg1, and the UE must wait for a next RO resource to attempt to send Msg1 again, which causes a delay in the sending of the message, and even causes a failure of the random access procedure.

For ease of understanding, some terms involved in the some embodiments of the present disclosure will be described in the following content.

Unlicensed Bands:

in future communication systems, unlicensed bands may be used as supplements to licensed bands to help an operator expand services. In order to keep consistent with new radio (NR) deployment and maximize NR-based unlicensed access as much as possible, the unlicensed bands may operate in frequency bands of 5 GHz, 37 GHz, 60 GHz, and the like. Since the unlicensed bands are shared by various radio access technologies (abbreviated as RATs), such as Wi-Fi, radar, long term evolution-license assisted access (abbreviated as LTE-LAA), the unlicensed bands must meet rules when used, such as listen before talk (abbreviated as LBT) and maximum channel occupancy time (abbreviated as MCOT), to ensure that all devices may fairly use the resource.

Listen before talk (i.e., LBT):

a transmitting terminal operating in an unlicensed band needs to monitor whether the frequency band (for example, the frequency band may be identified by a center frequency and a bandwidth) is occupied before transmitting a signal, and if the frequency band is not occupied, the transmitting terminal may transmit a signal on this frequency band.

Dual Connectivity:

the dual connectivity means that a user equipment (UE) may be simultaneously connected to two base stations, and the two base stations simultaneously provide data transceiving services for the UE. Since the UE may use radio resources of the two base stations simultaneously, a transmission rate of service data of the UE may be improved.

Random Access Procedure:

the random access procedure is mainly divided into a contention-free random access procedure and a contention based random access procedure.

The contention-free random access procedure mainly includes the following three messages:

transmitting messages for random access preamble assignment, i.e., Msg0;

a message carrying a random access preamble, i.e., Msg1; and a message carrying a random access response, i.e., Msg2.

Referring to FIG. 1, the contention-free random access procedure mainly includes step 101 to step 103.

In the step 101, the terminal device receives a random access preamble assignment message sent by the base station.

The step 101 is receiving, by the terminal device, Msg0 sent by the base station. The base station may allocate, a dedicated random access resource for the contention-free random access, to the UE, and the resource may be indicated through a physical downlink control channel (PDCCH) message or a radio resource control (RRC) message.

In the step 102, the terminal device sends a message carrying a random access preamble to the base station.

The step 102 is sending, by the terminal device, Msg1 to the base station. The terminal device sends a specified assigned random access signal to the base station on a specified random access resource according to indication of Msg0. After sending Msg1, the terminal device calculates identity information in Msg2 scheduled by the network side, i.e., a random access radio network temporary identity (RA-RNTI), according to locations of a time and a frequency at which Msg1 was sent. After sending Msg1, the terminal device monitors a downlink channel within a fixed window, i.e., a random access response (RAR) window, to obtain feedback information Msg2 that is from the network side.

In the step 103, the terminal device receives a random access response message sent by the base station.

The step 103 is receiving, by the terminal device, Msg2 sent by the base station. The base station sends the random access response message to the terminal device, and the random access response message may include identity information of Msg1 (i.e., a random access preamble identity (RAP ID)), an uplink timing advance command, an uplink grant (i.e., UL grant), a backoff indicator, temporary terminal identity information (i.e., a temporary cell radio network temporary identity (Temporary C-RNTI)), and other information. If the terminal device fails to receive the RAR message, a time for sending the random access next time is determined according to a backoff information indicated in the RAR message.

The contention based random access procedure mainly includes the following four messages:
a message carrying a random access preamble, i.e., Msg1;
a message carrying a random access response, i.e., Msg2;
a message carrying a scheduled transmission, i.e., Msg3; and
a message carrying a contention resolution, i.e., Msg4.

Figure 2:
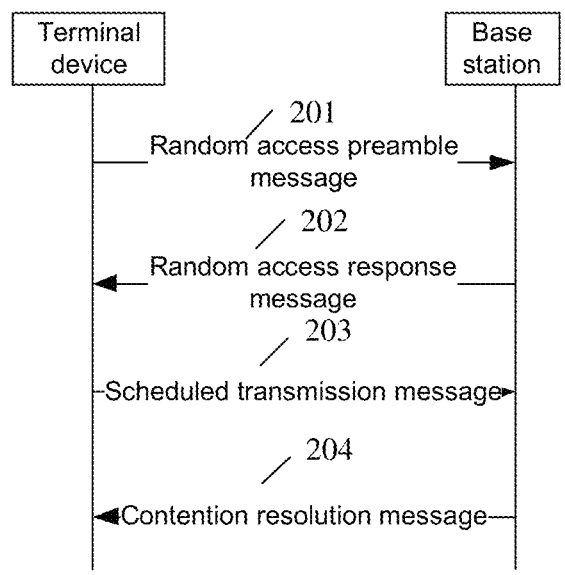
FIG. 2 is a flow diagram of a contention based random access procedure, in accordance with some embodiments of the present disclosure.

Referring to FIG. 2, the contention based random access procedure mainly includes step 201 to step 204.

In the step 201, the terminal device sends the message carrying a random access preamble to the base station.

The step 201 is sending, by the terminal device, Msg1 to the base station. The terminal device selects a random access resource and transmits a selected random access signal to the base station by using the random access resource. A method for calculating the random access-radio network temporary identity (RA-RNTI) and a method for calculating the RAR window are the same as those in the contention-free random access procedure.

In the step 202, the terminal device receives a random access response message sent by the base station.

The step 202 is receiving, by the terminal device, Msg2 sent by the base station. The base station receives Msg1, calculates a timing advance (i.e., TA), and sends a random access response to the terminal device, and the random access response includes at least the timing advance information and an uplink grant (i.e., UL grant) for Msg3.

In the step 203, the terminal device sends a scheduled transmission message.

The step 203 is sending, by the terminal device, Msg3 to the base station. The terminal device sends an uplink transmission on an uplink grant (i.e., UL grant) specified by Msg2. Msg3 carries different contents for different random access reasons. For example, for an initial access, Msg3 carries a RRC connection establishment request. The terminal device starts a contention resolution timer after sending Msg3. If Msg4 is not successfully received before the contention resolution timer expires, the terminal device determines that a reception of Msg4 has failed.

In the step 204, the terminal device receives a contention resolution message sent by the base station.

Specifically, the step 204 is receiving, by the terminal device, Msg4 sent by the base station. The terminal device can determine whether the random access is successful according to Msg4.

Currently, for a single connected UE, the network side only allows one UE to initiate no more than one random access channel (RACH) procedure at one moment; and for a dual connected UE, the network only allows one UE to initiate no more than one RACH procedure at each base station at one moment.

Bandwidth part (abbreviated as BWP):
in the future mobile communication system (e.g., a fifth generation (5G) system), a cell on the network side may support a relatively large bandwidth (e.g., 400 MHz), and the UE may only need to operate in a relatively small operating bandwidth (e.g., 20 MHz) for a capability reason or for a purpose of reducing power consumption. In this case, the small bandwidth part in which the UE operates is considered as a BWP. In a cell, the network may configure one or more BWPs for the UE. At a same time, the UE operates on the one or more BWPs of the cell.

Supplementary uplink carrier (abbreviated as SUL carrier):
in the future mobile communication system (e.g., the 5G system), a cell may be configured with two uplink carriers, one of which is a supplementary uplink carrier. When the network side is to control the UE to send data on a certain carrier, the network side may indicate the carrier identity (e.g., SUL carrier indication or normal uplink (NUL) carrier indication). NR Cell:
in NR, a cell usually operates in a high frequency band, and a signal has a large transmission loss in space. If an entire cell is covered by a single beam, the base station will be required to support a very high transmit power. To solve this problem, for a NR cell, the cell may be covered with a plurality of beams operating in a time-division manner.

Figure 3:
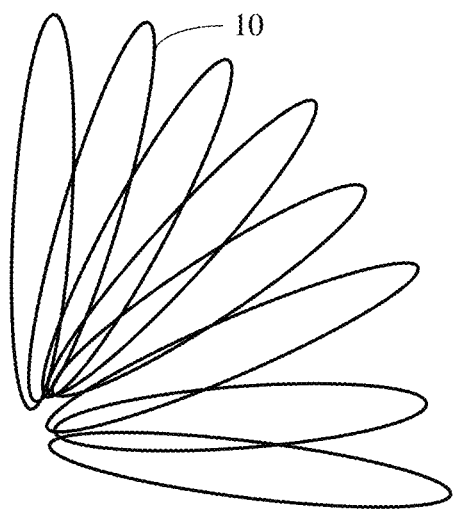
FIG. 3 is a schematic diagram of a plurality of beams covering a cell, in accordance with some embodiments of the present disclosure.

As shown in FIG. 3, a sector cell is covered by eight beams 10, the eight beams 10 are transmitted in a time-division manner, and the cell transmits only one beam at a moment. The UE identifies different beams according to reference symbols, which include synchronization signal blocks (SSBs) and channel state information reference signals (CSI-RSs). The UE may determine reference symbols to be monitored by itself according to a configuration of the network side, and may determine one or more beams covering a location of itself according to the monitored reference symbols.

Physical random access channel (PRACH) resource configuration of a NR cell:
in a NR cell, PRACH resources (including time domain, frequency domain, and preambles) may be beam-related, that is, PRACH resources available to UEs located in different beam coverages are different.

Figure 4:
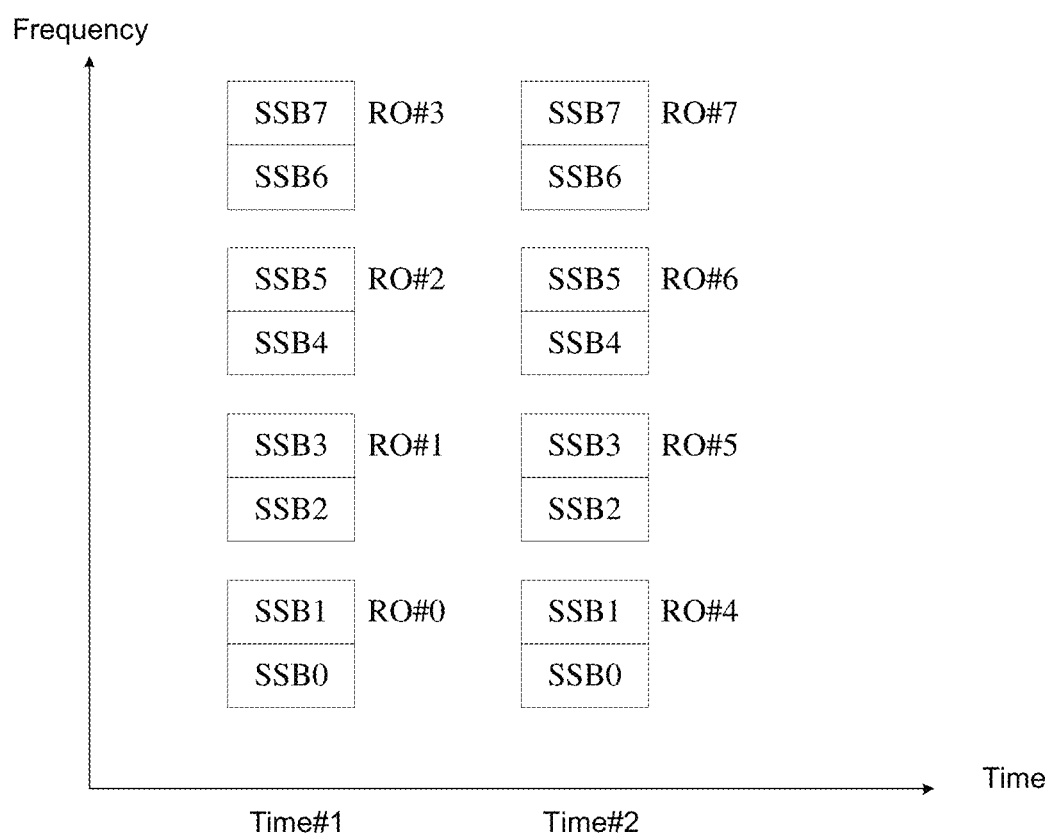
FIG. 4 is a schematic diagram showing associations between RO resources and synchronization signal blocks (SSBs), in accordance with some embodiments of the present disclosure.

A possible PRACH resource configuration may be as shown in FIG. 4, a cell is covered by eight beams, and at times (i.e., time #1 and time #2) when configured PRACH resources exist, there are four frequencies configured with PRACH resources. Time frequency resources on PRACHs are RO #0 to RO #3. At each physical random access channel occasion (RO), there are sixty four selectable preambles (indexes of which are 0 to 63) to choose from. The "RO" denotes a time-frequency resource on a PRACH for carrying a preamble.

Each RO is associated with two beams, and ranges of preamble indexes available to the two beams are different. For example, indexes of preambles available to an even-numbered beam (i.e., a beam associated with SSB #0, SSB #2, SSB #4, . . . , or SSB #2n, n being an integer) are 0 to 31, and indexes of preambles available to an odd-numbered beam (i.e., a beam associated with SSB #1, SSB #3, . . . , or SSB #(2n+1), n being a positive integer) are 32 to 63.

If the UE determines that it is located in a coverage of SSB0 according to the received SSB, an RO available to the UE is RO #0, and indexes of preambles available to the UE are 0 to 31.

In this way, after the UE sends the preamble, the base station may determine a beam or a SSB where the UE is located according to the index of the received preamble and the RO time frequency resource carrying the preamble, so as to determine beams or SSBs for sending Msg2 and subsequent downlink messages. The time frequency resource is also a time-frequency resource.

Selection procedure of SSB and preamble in contention-free random access (abbreviated as CFRA):
in NR, a cell may reserve CFRA resources for the UE in one or more beams. In this case, the cell may notify the UE in advance of SSBs and/or CSI-RSs and preamble indexes that correspond to the beams that are assigned with the CFRA resources, and signal thresholds of the SSBs and/or CSI-RSs. In the random access of the UE, the UE first selects a SSB and/or a CSI-RS, and then selects a preamble, which may be as follows.

SSB and/or CSI-RS selection:

case a1: in a case where there are one or more SSBs with signal qualities (the signal qualities including but being not limited to reference signal receiving powers (RSRPs) or reference signal receiving qualities (RSRQs) of the SSBs) higher than a signal threshold of a pre-configured SSB and the SSB(s) are associated with the CFRA resources, the UE selects a SSB satisfying both of the two conditions; or case a2: in a case where there are one or more CSI-RSs with signal qualities (the signal qualities including but being not limited to RSRPs or RSRQs of the CSI-RSs) higher than a signal threshold of a pre-configured CSI-RS and the CSI-RS(s) are associated with the CFRA resources, the UE selects a CSI-RS satisfying both of the two conditions; or case a3: except the case a1 and the case a2, if there is a SSB that is not associated with the CFRA resource, but the signal quality of which exceeds the threshold of the pre-configured SSB, the UE selects the SSB exceeding the threshold; or case a4: except the case a1, the case a2, and the case a3, the UE selects any one SSB, which may be a SSB associated with the CFRA resource or any other SSB.

Preamble selection (preamble selection methods for the four cases (i.e., the case a1 to the case a4) being described):

case b1: the UE selects a preamble indicated by a preamble index in the CFRA resources that are allocated to the UE by the cell and are associated with the selected SSB; case b2: the UE selects a preamble indicated by a preamble index in the CFRA resources that are allocated to the UE by the cell and are associated with the selected CSI-RS. If the cell is not configured with the preamble corresponding to the CFRA resources that are associated with the CSI-RS, the UE uses a preamble corresponding to CFRA resources associated with a SSB that is quasi co-located (QCL) with the selected CSI-RS; case b3: the UE selects a contention preamble from a RO corresponding to the selected SSB; and case b4: the UE selects a contention preamble from the RO corresponding to the selected SSB.

Referring to FIG. 5, FIG. 5 is a schematic diagram of a network system structure to which some embodiments of the present disclosure may be applied. As shown in FIG. 5, the network system includes a terminal device 11 and a network side device 12. The terminal device 11 may be a terminal side device such as a mobile phone, a tablet personal computer, a laptop computer, a personal digital assistant (abbreviated as PDA), a mobile internet device (MID), or a wearable device. It will be noted that a specific type of the terminal device 11 is not limited in some embodiments of the present disclosure. The network side device 12 may be a base station, such as a macro base station, a long term evolution (LTE) evolved Node B (eNB), 5G NR Node B (NB). The network side device 12 may also be a micro base station, such as a pico station, a femto station and other low power nodes (LPNs). The network side device 12 may also be an access point (AP). The base station may also be one of network nodes composed of a central unit (CU) and a plurality of transmission reception points (TRPs) managed and controlled by the CU. It will be noted that, a specific type of the network side device 12 is not limited in some embodiments of the present disclosure.

In some embodiments of the present disclosure, since there is an association relationship between RO resources and SSBs or CSI-RSs, the terminal device 11 may select N RO resources from the RO resources associated with SSBs or CSI-RSs that it has monitored, and perform LBT operations on LBT frequency bands corresponding to the selected N RO resources, so as to select M target RO resources from the N RO resources, and send the preambles to the network side device 12 by using the M target RO resources.

For example, at least two RO resources in the N RO resources are corresponding to different LBT frequency bands, the target RO resources are RO resources in the N RO resources at which the LBTs are successful, N is an integer greater than 1, and M is an integer less than or equal to N and greater than or equal to 1.

Optionally, the network side device 12 may send a CFRA resource configuration which includes one or at least two RO resources to the terminal device 11, so that the terminal device 11 may select RO resource(s) corresponding to the CFRA resource configuration to perform LBT operation.

In some embodiments of the present disclosure, since there are at least two RO resources corresponding to different LBT frequency bands, a probability of successes of LBTs may be increased, and a probability of a delay sending of Msg1 in the random access procedure may be reduced.

Some embodiments of the present disclosure provide a random access method. Referring to FIG. 6, FIG. 6 is a flow diagram of a random access method, in accordance with some embodiments of the present disclosure. As shown in FIG. 6, the random access method includes step 601 and step 602.

In the step 601, LBT operations are performed on the LBT frequency bands corresponding to N RO resources, and M target RO resources are selected from the N RO resources. At least two RO resources in the N RO resources are corresponding to different LBT frequency bands, the target RO resources are RO resources in the N RO resources at which the LBTs are successful, N is an integer greater than 1, and M is an integer less than or equal to N and greater than or equal to 1.

In some embodiments of the present disclosure, the N RO resources may be N RO resources selected by the terminal device from RO resources corresponding to the SSBs or CSI-RSs that the terminal device has monitored.

Optionally, the N RO resources may include RO resources corresponding to the CFRA resource configuration, or may include RO resources that are not corresponding to the CFRA resource configuration. It will be noted that, the RO resources corresponding to the CFRA resource configuration may refer to RO resources that are the same as RO resources included in the CFRA resource configuration allocated by the network side device, and the RO resources that are not corresponding to the CFRA resource configuration may refer to RO resources that are different from the RO resources included in the CFRA resource configuration allocated by the network side device.

At least two RO resources in the N RO resources are corresponding to different LBT frequency bands, and the LBT frequency bands corresponding to the RO resources may refer to LBT frequency bands including frequencies at which the RO resources are located.

Optionally, portion of the N RO resources may be corresponding to the same LBT frequency bands, and the other portion of the N RO resources may be corresponding to different LBT frequency bands. Alternatively, all the N RO resources may be corresponding to different LBT frequency bands. For example, RO #1 corresponds to LBT frequency band #1, RO #2 corresponds to LBT frequency band #2, RO #3 corresponds to LBT frequency band #3, and RO #4 corresponds to LBT frequency band #4.

In this step, the terminal device may perform an LBT operation on an LBT frequency band corresponding to a respective one of the N RO resources, and then select the M target RO resources from RO resources at which LBTs are successful. Alternatively, the LBT operations may be performed on the LBT frequency bands corresponding to the N RO resources, and once M target RO resources have been selected from the N RO resources, LBT operations that have not yet been performed at RO resources in the N RO resources are abandoned. The LBTs being successful may mean that it is monitored that the LBT frequency bands are unoccupied.

It will be noted that, that the LBT frequency band is unoccupied may mean that an energy value detected on the LBT frequency band is lower than a preset threshold.

In an implementation, M may be 1, and the target RO resource may be any one of the RO resources at which the LBT is successful; or, the target RO resource may be a RO resource corresponding to an SSB or a CSI-RS that has a best signal quality in the SSBs or CSI-RSs corresponding to the RO resources at which the LBTs are successful; or, the target RO resource may be any RO resource corresponding to an SSB or a CSI-RS with a signal quality greater than the preset threshold in the SSBs or CSI-RSs corresponding to the RO resources at which the LBTs are successful; or, the target RO resource may be a RO resource that has the highest priority in the RO resources at which the LBTs are successful.

In another implementation, M may be greater than 1, and the M target RO resources include M RO resources in the RO resources at which the LBTs are successful. For example, the M target RO resources include M RO resources selected according to priorities of the RO resources at which the LBTs are successful; or, the M target RO resources include M RO resources selected according to signal qualities of SSBs or CSI-RSs that are corresponding to the RO resources at which the LBTs are successful.

In the step 602, preambles are sent by using the M target RO resources.

In some embodiments of the present disclosure, the preambles may be sent to the network side device by using the selected M target RO resources.

It will be understood that, in a case where M is greater than 1, a preamble corresponding to a respective target RO resource may be sent by using the respective target RO resource. For example, a preamble corresponding to a target RO resource a is sent by using the target RO resource a, and a preamble corresponding to a target RO resource b is sent by using the target RO resource b. Optionally, before the step 602, a preamble corresponding to a respective one of the N RO resources may be selected.

It will be noted that, in a case where the selected target RO resource is the RO resource corresponding to the CFRA resource configuration, the preamble corresponding to the target RO resource may be a preamble (s) allocated by the network side. In a case where the selected target RO resource is the RO resource corresponding to the contention based random access (CBRA) resource configuration, the preamble corresponding to the target RO resource may be a preamble selected by the terminal device.

In the random access method provided by some embodiments of the present disclosure, the LBT operations are performed on the LBT frequency bands corresponding to the N RO resources, and the M target RO resources are selected from the N RO resources. At least two RO resources in the N RO resources are corresponding to different LBT frequency bands, the target RO resources are the RO resources in the N RO resources at which the LBTs are successful, N is the integer greater than 1, and M is the integer less than or equal to N and greater than or equal to 1. The preambles are sent by using the M target RO resources. Since there are at least two RO resources corresponding to different LBT frequency bands, the probability of successes of the LBTs may be increased, the probability of a delay sending of Msg1 in the random access procedure may be reduced, and a probability of failure of the random access may be reduced.

Optionally, each of the N RO resources corresponds to a different LBT frequency band.

In some embodiments of the present disclosure, each of the N RO resources corresponds to a different LBT frequency band, which may further increase the probability of successes of the LBTs.

Optionally, before the LBT operations are performed on the LBT frequency bands corresponding to the N RO resources, the method further includes: receiving a CFRA resource configuration sent by the network side device, wherein the N RO resources include the RO resources corresponding to the CFRA resource configuration.

In some embodiments of the present disclosure, the terminal device may receive the CFRA resource configuration sent by the network side device, and the CFRA resource configuration may include one or at least two RO resources.

For example, in a case where the CFRA resource configuration sent by the network side device is received, the N RO resources may include the RO resource(s) corresponding to the CFRA resource configuration. Since the RO resource (s) and the preamble(s) corresponding to the CFRA resource configuration are RO resource(s) and preamble(s) reserved by the network side device for the terminal device, a combination of the RO resource(s) and the preamble(s) will not be used by other terminal devices (i.e., UEs), and thus the terminal device will not collide with other terminal devices in RACH.

Optionally, the N RO resources are N RO resources selected based on signal qualities of the SSBs or CSI-RSs corresponding to RO resources.

In some embodiments of the present disclosure, the signal qualities of the SSBs or CSI-RSs may include, but are not limited to, the RSRPs or RSRQs.

Optionally, according to the signal qualities of the monitored SSBs or CSI-RSs, the terminal device may select N RO resources from RO resources corresponding to the SSBs or CSI-RSs that the terminal device has monitored. For example, the terminal device may first select SSBs or CSI-RSs according to the signal qualities of the monitored SSBs and/or CSI-RSs, and then select N RO resources from RO resources corresponding to the selected SSBs or CSI-RSs.

For example, after the SSBs or CSI-RSs being sorted from good to bad according to the signal qualities, RO resources corresponding to SSBs or CSI-RSs with signal qualities in the top N may be selected, or RO resources corresponding to N SSBs or CSI-RSs with signal qualities greater than the preset threshold are selected.

Optionally, the N may be greater than 1 and less than or equal to P, and the P may be configured by the network side or agreed in a protocol.

Optionally, in a case where the number B of the SSBs or CSI-RSs with the signal qualities exceeding the preset threshold is greater than 1, if B is greater than 1 and is less than or equal to P, the RO resources corresponding to all the SSBs or CSI-RSs with the signal qualities greater than the preset threshold may be selected. If B is greater than P, RO resources corresponding to SSBs or CSI-RSs with signal qualities in the top P may be selected after the signal qualities are sorted from good to bad.

Optionally, in a case where the number B of the SSBs or CSI-RSs with the signal qualities exceeding the preset threshold is less than or equal to 1, the RO resources corresponding to the SSB or CSI-RS with the signal qualities in the top P in the sort of the signal qualities from good to bad may be selected, or the RO resource corresponding to the SSB or CSI-RS with the best signal quality may be selected.

In some embodiments of the present disclosure, the N RO resources are selected according to the signal qualities of the SSBs or CSI-RSs corresponding to RO resources, which may increase a probability of successfully sending the preambles by using the RO resources, and further reduce the probability of failure of the random access.

Optionally, the N RO resources all belong to a same cell, or the N RO resources belong to at least two cells.

In some embodiments of the present disclosure, the N RO resources may belong to the same cell or belong to different cells.

Optionally, the N RO resources all belong to a same carrier of the same cell, or belong to different carriers (including an SUL carrier and a normal carrier) of the same cell.

Optionally, the N RO resources may belong to a same BWP, or the N RO resources belong to at least two BWPs.

In some embodiments of the present disclosure, the N RO resources may belong to the same BWP or belong to different BWPs.

Optionally, the M target RO resources are M RO resources selected from RO resources at which simultaneous LBTs are successful, and the RO resources at which the simultaneous LBTs are successful include RO resources at which end times of LBT operations are the same and the LBTs are successful, or RO resources whose start times are the same and at which LBTs are successful, or RO resources at which start times of LBT operations are the same and the LBTs are successful.

In some embodiments of the present disclosure, the LBT operations may be performed on the LBT frequency bands corresponding to the RO resources before the start times of the RO resources. The RO resources at which the simultaneous LBTs are successful may refer to the RO resources at which the end times of the LBT operations are the same and the LBTs are successful, or the RO resources whose start times are the same and at which the LBTs are successful, or the RO resources at which the start times of the LBT operations are the same and the LBTs are successful.

For example, referring to FIG. 7, start times of RO #1, RO #2, and RO #3 are the same, and a start time of RO #4 is later than the start times of RO #1, RO #2, and RO #3. Therefore, the terminal device may respectively perform LBT operations on LBT frequency bands corresponding to RO #1, RO #2, and RO #3 before the start times of RO #1, RO #2, and RO #3. If there are at least two RO resources at which LBTs are successful in RO #1, RO #2, and RO #3, the at least two RO resources are RO resources at which simultaneous LBTs are successful.

In practical applications, since occupancy states of the LBT frequency bands corresponding to the RO resources may be different at different times, in some embodiments of the present disclosure, by selecting M RO resources from the RO resources at which the simultaneous LBTs are successful, it is possible to ensure that LBT frequency band(s) corresponding to the selected RO resource(s) at which the LBT(s) are successful are unoccupied.

Optionally, the M target RO resources are M RO resources selected from the RO resources at which the LBTs are successful, based on the signal qualities of the SSBs or CSI-RSs corresponding to the RO resources at which the LBTs are successful; or the M target RO resources are M RO resources selected from the RO resources at which the LBTs are successful, based on the priorities corresponding to the RO resources at which the LBTs are successful.

In an implementation, the M target RO resources may be M RO resources selected from L RO resources at which the LBTs are successful, based on the signal qualities of the SSBs or CSI-RSs corresponding to the RO resources at which the LBTs are successful.

Optionally, the M may be greater than or equal to 1 and less than Q, and the Q may be configured by the network side or agreed in the protocol.

For example, if L is greater than Q, after the SSBs or CSI-RSs corresponding to the L RO resources at which the LBTs are successful are sorted from good to bad according to the signal qualities thereof, RO resources corresponding to SSBs or CSI-RSs with signal qualities in the top Q may be the M target RO resources; and if L is less than or equal to Q, the M target RO resources may be the L RO resources at which the LBTs are successful.

In some embodiments of the present disclosure, the M RO resources are selected from the L RO resources at which the LBTs are successful, based on the signal qualities of the SSBs or CSI-RSs corresponding to the RO resources at which the LBTs are successful, which may increase the probability of successfully sending the preambles by using the RO resources, and further reduce the probability of failure of the random access.

In another implementation, the M target RO resources may be the M RO resources selected from the RO resources at which the LBTs are successful, based on the priorities corresponding to the L RO resources at which the LBTs are successful.

For example, if L is greater than Q, the M target RO resources may be RO resources with priorities in the top Q among the L RO resources at which the LBTs are successful, corresponding to SSBs or CSI-RSs; and if L is less than or equal to Q, the M target RO resources may be the L RO resources at which the LBTs are successful.

Optionally, a rule of the priorities of the RO resources may include that the higher the signal quality of the SSB or CSI-RS corresponding to the RO resource is, the higher the priority of the RO resource is, or that the priority of the RO resource corresponding to the CFRA resource configuration is higher than the priority of the RO resource corresponding to the CBRA resource configuration.

In some embodiments of the present disclosure, the M RO resources are selected from the RO resources at which the LBTs are successful, based on the priorities corresponding to the L RO resources at which the LBTs are successful, which may increase the probability of successfully sending the preambles by using the RO resources, and further reduce the probability of failure of the random access.

Optionally, the rule of the priorities of the RO resources includes: the rule that a priority of a RO resource of a first type is higher than a priority of a RO resource of a second type; and/or the rule that the higher a signal quality of an SSB or a CSI-RS corresponding to a RO resource in RO resources of a same type is, the higher a priority of the RO resource is; wherein the RO resource of the first type is the RO resource corresponding to the CFRA resource configuration, and the RO resource of the second type is the RO resource corresponding to the CBRA resource configuration.

In some embodiments of the present disclosure, the priority of the RO resource corresponding to the CFRA resource configuration is higher than the priority of the RO resource corresponding to the CBRA resource configuration, and/or the higher the signal quality of the SSB or CSI-RS corresponding to the RO resource in the RO resources of the same type is, the higher the priority of the RO resource is.

For example, if the RO resources at which the LBTs are successful include RO #1, RO #2, and RO #3. RO #1 and RO #2 are RO resources corresponding to the CFRA resource configuration, a signal quality of an SSB or CSI-RS corresponding to RO #1 is higher than that of an SSB or CSI-RS corresponding to RO #2, and RO #3 is a RO resource corresponding to the CBRA resource configuration, then RO #1 has a higher priority than RO #2, and RO #2 has a higher priority than RO #3.

In some embodiments of the present disclosure, the priority of the RO resource corresponding to the CFRA resource configuration is higher than the priority of the RO resource corresponding to the CBRA resource configuration, which may reduce a probability of collision between the terminal device and other terminal devices. In addition, the higher the signal quality of the SSB or CSI-RS corresponding to the RO resource in the RO resources of the same type is, the higher the priority of the RO resource is, which may increase the probability of successfully sending the preambles by using the RO resources, and further reduce the probability of failure of the random access.

Optionally, the step of performing the LBT operations on the LBT frequency bands corresponding to the N RO resources and selecting the M target RO resources from the N RO resources includes: performing the LBT operations on the LBT frequency bands corresponding to the N RO resources until the M target RO resources are selected from the N RO resources, and abandoning the LBT operations that have not yet been performed at RO resources in the N RO resources.

In some embodiments of the present disclosure, LBT operations may be performed sequentially on the LBT frequency bands corresponding to the N RO resources. Once the M target RO resources have been selected from the N RO resources, the LBT operations that have not yet been performed at the RO resources in the N RO resources may be abandoned, so as to save the power consumption of the terminal device.

For example, referring to FIG. 7, the start times of RO #1, RO #2, and RO #3 are the same, and the start time of RO #4 is later than the start times of RO #1, RO #2, and RO #3. Therefore, the terminal device may perform the LBT operations on the LBT frequency bands corresponding to RO #1, RO #2, and RO #3 before the start times of RO #1, RO #2, and RO #3. If the LBTs are successful on the LBT frequency bands corresponding to RO #1 and RO #3, and RO #1 and RO #3 are selected as target RO resources to send preambles, then the LBT operation performed on the LBT frequency band corresponding to RO #4 may be abandoned to save system resources.

Optionally, the N RO resources are N RO resources determined by a media access control (MAC) layer of the terminal device; and the step of performing the LBT operations on the LBT frequency bands corresponding to the N RO resources and selecting the M target RO resources from the N RO resources includes: performing, by a physical (PHY) layer of the terminal device, the LBT operations on the LBT frequency bands corresponding to the N RO resources, and selecting, by the PHY layer of the terminal device, the M target RO resources from the N RO resources.

In some embodiments of the present disclosure, the terminal device may select the N RO resources through the MAC Layer, and notify the PHY layer of relevant information (e.g., time-frequency resource locations of the RO resources, and corresponding preambles), so that the PHY Layer determines frequencies of the LBTs and starts the LBTs when appropriate. The terminal device may perform the LBT operations on the LBT frequency bands corresponding to the N RO resources through the PHY layer, and select the M target RO resources from the N RO resources through the PHY layer, so as to send the preambles through the M target RO resources.

It will be understood that, as for a manner in which the N RO resources are selected and a manner in which the M target RO resources are selected, reference may be made to the foregoing description, and details are not repeated herein.

Optionally, before the PHY layer of the terminal device performs the LBT operations on the LBT frequency bands corresponding to the N RO resources, and selects the M target RO resources from the N RO resources, the method further includes: sending, by the MAC layer, first notification information to the PHY layer. The first notification information includes identity information corresponding to each of the N RO resources and/or a rule of priorities of the RO resources that is configured by the MAC layer.

In some embodiments of the present disclosure, the identity information corresponding to the RO resource may be a unique index corresponding to the RO resource, or an SSB corresponding to the RO resource.

Optionally, after the PHY layer of the terminal device performs the LBT operations on the LBT frequency bands corresponding to the N RO resources, and selects the M target RO resources from the N RO resources, the method further includes: sending, by the PHY layer, second notification information to the MAC layer. The second notification information includes identity information of the M target RO resources.

In some embodiments of the present disclosure, the identity information of the target RO resource may be a unique index corresponding to the target RO resource, or an SSB corresponding to the target RO resource.

Optionally, after the preambles are sent by using the M target RO resources, the method further includes: in a case where it is determined that a preamble needs to be resent, if a selected RO resource for resending the preamble and a target RO resource correspond to a same SSB or CSI-RS, performing a power ramping operation; and/or, if the selected RO resource for sending the preamble and the target RO resource which sending the preamble correspond to different SSBs or CSI-RSs, maintaining a sending power of the preamble.

In some embodiments of the present disclosure, if the terminal device does not receive Msg2 after sending Msg1, or does not receive Msg4 after sending Msg3, the terminal device needs to retransmit the preamble until a maximum number of preamble retransmissions is reached. When the preamble is resent, if the selected RO resource and a RO resource used by the terminal device for sending the preamble last time correspond to the same SSB or CSI-RS, the terminal device may perform the power ramping operation. Otherwise, the terminal device may not perform the power ramping operation, i.e., maintain the sending power of the preamble.

In some embodiments of the present disclosure, in the case where it is determined that the preamble needs to be resent, if the selected RO resource for resending the preamble and the target RO resource correspond to the same SSB or CSI-RS, the power ramping operation is performed, which may increase a probability of success of the random access. If the selected RO resource for resending the preamble and the target RO resource correspond to different SSBs or CSI-RSs, the sending power of the preamble is maintained, so as to save the power consumption of the terminal device.

Optionally, some embodiments of the present disclosure further provide a random access method, and the method may include the following steps a0 to a2.

In the step a0, the terminal device receives a CFRA resource configuration configured by the network-side-device, and the CFRA resource configuration includes at least time-frequency locations of one or more RO resources and a preamble index corresponding to a respective RO resource.

It will be noted that the step a0 is an optional step, that is, the step a0 may be performed or may not be performed.

In the step a1, the terminal device selects N RO resources, and selects a preamble index for each RO resource.

The N may be greater than or equal to 1 and less than or equal to P, and the P is configured by the network-side-device or agreed in the protocol.

The selected N RO resources have at least one of the following characteristics: in terms of frequency, not all the N RO resources belonging to a same LBT frequency band; in terms of frequency, any two RO resources in the N RO resources belonging to different LBT frequency bands; the N RO resources belonging to a same BWP; the N RO resources belonging to a plurality of BWPs; the N RO resources belonging to a same cell; and the N RO resources belonging to a plurality of cells; the selected RO resources may be or may not be RO resources corresponding to the CFRA resource configuration.

An optional method for selecting the RO resources is as follows. In a case where there are B SSBs or CSI-RSs with signal qualities exceeding the preset threshold, if B is equal to 0, the RO resource corresponding to the SSB or CSI-RS with the best signal quality is selected. If B is greater than 0 and is less than or equal to P, RO resources corresponding to all the B SSBs or CSI-RSs are selected. If B is greater than P, RO resources corresponding to P SSBs or CSI-RSs with good signal qualities are selected. For example, after the SSBs or CSI-RSs are sorted according to the signal qualities from good to bad, the RO resources corresponding to the SSBs or CSI-RSs with the signal qualities in the top P are selected.

In step a2, before the start time of each RO resource, the terminal device performs an LBT operation on an LBT frequency band corresponding to the RO resource.

After the end of the LBT, if there are RO resource(s) at which LBT(s) are successful, the target RO resource(s) may be selected from the RO resource(s) at which the LBT(s) are successful to send the preamble(s) that have been selected in the step a1.

In an implementation, one target RO resource may be selected from the RO resource(s) at which the LBT(s) are successful to send a preamble.

Optionally, after the end of the LBT, if there is only one RO resource at which the LBT is successful, a corresponding preamble is sent at the RO resource.

Optionally, after the end of LBTs, if there are a plurality of RO resources at which the LBTs are successful, one of the plurality of RO resources may be selected to send a corresponding preamble.

Optionally, if there are a plurality of RO resources at which the LBTs are successful, the terminal device may select a RO resource with a highest priority to send the preamble.

The rule of the priorities of the RO resources may include at least one of the following rules: a rule that the priority of the RO resource corresponding to the CFRA resource configuration is higher than the priority of the RO resource corresponding to the CBRA resource configuration; a rule that the higher the signal quality of the SSB or CSI-RS corresponding to the RO resource is, the higher the priority of the RO resource is; and a rule that for the RO resources corresponding to the CFRA resource configuration, the higher the signal quality of a corresponding SSB or CSI-RS is, the higher the priority of the RO resource corresponding to the CFRA resource configuration is.

Optionally, if there are a plurality of RO resources at which the LBTs are successful, and the RO resources at which the LBTs are successful include the RO resources corresponding to the CFRA resource configuration, the terminal device may select any one of the RO resources with the signal qualities of the corresponding SSBs or CSI-RSs higher than the preset threshold to send a preamble.

In another implementation, at least two target RO resources may be selected from the RO resources at which the LBTs are successful to send preambles.

Optionally, after the end of the LBTs, if there are a plurality of RO resources at which the LBTs are successful, the terminal device may select X of the plurality of RO resources to send corresponding preambles, and X is greater than 1, and a value of X is configured by the network side or agreed in the protocol.

Optionally, based on the priorities corresponding to the RO resources at which the LBTs are successful, the terminal device may select the X RO resources to send the corresponding preambles.

For example, the terminal device may select RO resources with priorities in the top X to send the preambles.

Optionally, the rule of the priorities of the RO resources may include at least one of the following rules: a rule that the priority of the RO resource corresponding to the CFRA resource configuration is higher than the priority of the RO resource corresponding to the CBRA resource configuration; and a rule that the higher the signal quality of the SSB or CSI-RS corresponding to the RO resource is, the higher the priority of the RO resource is.

Optionally, after the terminal device has selected the RO resources for sending the preambles, LBT operations at the remaining RO resources that have not yet been performed are abandoned.

An interaction between the MAC layer and the PHY layer of the terminal device in the random access method provided by some embodiments of the present disclosure will be described below: in step b0, the terminal device receives the CFRA resource configuration configured by the network side, and the CFRA resource configuration includes at least time-frequency locations of one or more RO resources and a preamble index corresponding to each RO resource.

It will be noted that the step b0 is an optional step, that is, the step b0 may be performed or may not be performed.

In step b1, the MAC layer of the terminal device selects N RO resources, selects a preamble index for each RO resource, and notifies the PHY layer of the relevant information.

It will be noted that, if the selected RO resources are RO resources corresponding to the CFRA resource configuration, the PHY layer may be notified of the preambles allocated by the network side.

The value of N may be greater than or equal to 1 and less than or equal to P, and the value of P is configured by the network side or agreed in the protocol.

The selected N RO resources have at least one of the following characteristics: in terms of frequency, not all the N RO resources belonging to the same LBT frequency band; in terms of frequency, any two RO resources in the N RO resources belonging to different LBT frequency bands; the N RO resources belonging to a same BWP; the N RO resources may belonging to a plurality of BWPs; the N RO resources belonging to a same cell; and the N RO resources belonging to a plurality of cells; the selected RO resources may be or may not be RO resources corresponding to the CFRA resource configuration.

An optional method for selecting the RO resources is as follows. In a case where there are B SSBs or CSI-RSs with signal qualities exceeding the preset threshold, if B is equal to 0, the RO resource corresponding to the SSB or CSI-RS with the best signal quality is selected. If B is greater than 0 and is less than or equal to P, RO resources corresponding to all the B SSBs or CSI-RSs are selected. If B is greater than P, RO resources corresponding to P SSBs or CSI-RSs with good signal qualities are selected. For example, after the SSBs or CSI-RSs are sorted according to the signal qualities from good to bad, the RO resources corresponding to the SSBs or CSI-RSs with the signal qualities in the top P are selected.

Optionally, in the information notified by the MAC layer to the PHY layer, each RO resource has a unique index.

Optionally, the MAC layer sets the rule of the priorities of the RO resources, and notifies the PHY layer of the rule of the priorities of the RO resources.

In step b2, before the start time of each RO resource, the PHY layer of the terminal device performs the LBT operation on the LBT frequency band corresponding to the RO resource.

After the end of the LBTs, if there are RO resource(s) at which LBT(s) are successful, the PHY layer may select the target RO resource(s) from the RO resource(s) at which the LBT(s) are successful to send the preamble(s) that have been selected in the step b1.

In an implementation, one target RO resource may be selected from the RO resource(s) at which the LBT(s) are successful to send a preamble.

Optionally, after the end of the LBTs, if there is only one RO resource at which the LBT is successful, a corresponding preamble is sent by using the RO resource.

Optionally, after the end of the LBTs, if there are a plurality of RO resources at which the LBTs are successful, one of the plurality of RO resources may be selected to send a corresponding preamble.

Optionally, if there are a plurality of RO resources at which the LBTs are successful, the PHY layer may select a RO resource with a highest priority to send a corresponding preamble.

The rule of the priorities of the RO resources may include at least one of the following rules: a rule that the priority of the RO resource corresponding to the CFRA resource configuration is higher than the priority of the RO resource corresponding to the CBRA resource configuration; a rule that the higher the signal quality of the SSB or CSI-RS corresponding to the RO resource is, the higher the priority of the RO resource is; and a rule that for the RO resources corresponding to the CFRA resource configuration, the higher the signal quality of the SSB or CSI-RS corresponding to a RO resource is, the higher the priority of the RO resource corresponding to the CFRA resource configuration is.

Optionally, if there are a plurality of RO resources at which the LBTs are successful, and the RO resources at which the LBTs are successful include the RO resources corresponding to the CFRA resource configuration, the PHY layer may select any one of the RO resources with the signal qualities of the corresponding SSBs or CSI-RSs higher than the preset threshold to send a preamble.

In another implementation, at least two target RO resources may be selected from the RO resources at which the LBTs are successful to send preambles.

Optionally, after the end of the LBTs, if there are a plurality of RO resources at which the LBTs are successful, the PHY layer of the terminal device may select X RO resources from the plurality of RO resources to send corresponding preambles, and X is greater than 1, and a value of X is configured by the network side or agreed in the protocol.

Optionally, according to the priorities corresponding to the RO resources at which the LBTs are successful, the PHY layer may select the X RO resources to send the corresponding preambles.

For example, the PHY layer may select RO resources with priorities in the top X to send the preambles.

Optionally, the rule of the priorities of the RO resources may include at least one of the following rules: a rule that the priority of the RO resource corresponding to the CFRA resource configuration is higher than the priority of the RO resource corresponding to the CBRA resource configuration; and a rule that the higher the signal quality of the SSB or CSI-RS corresponding to the RO resource is, the higher the priority of the RO resource is.

Optionally, after the PHY layer has selected the RO resources for sending the preambles, LBT operations at the remaining RO resources that have not yet been performed are abandoned.

Optionally, the PHY layer may notify the MAC layer of the identity information of the selected RO resources for sending the preambles, such as the unique indexes or the SSBs corresponding to the RO resources.

In the random access method provided by some embodiments of the present disclosure, the terminal device selects a plurality of RO resources located in a plurality of LBT frequency bands to perform the LBT operations, and the selected RO resources may include the RO resource(s) corresponding to the CFRA resource configuration and the RO resource(s) corresponding to the CBRA resource configuration. In a case where there are a plurality of RO resources at which the LBTs are successful, the terminal device may select one or more RO resources according to the priorities to send the preamble(s), so that the delay in the random access procedure may be reduced, and the probability of failure of the random access may be reduced.

The some embodiments of the present disclosure will be described below by taking an example: as shown in FIG. 7, the terminal device selects four optional RO resources, i.e., RO #1, RO #2, RO #3, and RO #4, to send preambles. RO #0 and RO #1 correspond to the CFRA resource configuration allocated by the network side, that is, RO #0 and RO #1 are RO resources corresponding to the CFRA resource configuration. RO #3 and RO #4 are not associated with the CFRA resource configuration, that is, RO #3 and RO #4 are RO resources corresponding to the CBRA resource configuration.

Before the start times of RO #1, RO #2, and RO #3, the terminal device performs the LBT operations on LBT frequency band #1, LBT frequency band #2, and LBT frequency band #3. Results of the LBTs show that LBT frequency band #1 and LBT frequency band #3 are available, that is, RO #1 and RO #3 are RO resources at which LBTs are successful.

In a case where the terminal device is configured to send a preamble by using only one RO resource, there may be the following two methods for selecting the RO resource: if the terminal device is configured to preferentially use the RO resources corresponding to the CFRA resource configuration, the terminal device selects RO #1 to send the preamble; if the terminal device is configured to preferentially use the RO resources corresponding to the SSBs or CSI-RSs with good signal qualities, the terminal device selects a RO resource with a better signal quality in the signal qualities of the SSBs or CSI-RSs corresponding to RO #1 and RO #3 to send the preamble.

In a case where the terminal device is configured to send preambles by using a plurality of RO resources, the terminal device may send the preambles by using RO #1 and RO #3.

After the LBTs are successful, the terminal device may abandon the LBTs corresponding to the other RO resources, such as the LBT corresponding to RO #4 in FIG. 7.

Some embodiments of the present disclosure further provide a random access method applied to the network side device. Referring to FIG. 8, FIG. 8 is a flow diagram of the random access method, in accordance with another embodiment of the present disclosure. As shown in FIG. 8, the random access method includes the following step 801:

in the step 801, a CFRA resource configuration is sent to the terminal device, and the CFRA resource configuration includes one or at least two RO resources.

In some embodiments of the present disclosure, the CFRA resource configuration sent by the network side device to the terminal device includes one or at least two RO resources, so that the terminal device may select RO resource(s) based on the one or at least two RO resources included in the CFRA resource configuration sent by the network side device, to send preamble(s).

Optionally, the CFRA resource configuration further includes a preamble index corresponding to each RO resource.

In some embodiments of the present disclosure, the CFRA resource configuration includes one or at least two RO resources, which may reduce the probability of collision between the terminal devices in the random access procedure and the probability of failure of the random access.

Referring to FIG. 9, FIG. 9 is a structural diagram of a terminal device, in accordance with some embodiments of the present disclosure. As shown in FIG. 9, the terminal device 900 includes a selection module 901 and a sending module 902; the selection module 901 is used to perform the LBT operations on the LBT frequency bands corresponding to the N RO resources, and select the M target RO resources from the N RO resources. At least two RO resources in the N RO resources are corresponding to different LBT frequency bands, and the target RO resources are RO resources in the N RO resources at which the LBTs are successful, N is an integer greater than 1, and M is an integer less than or equal to N and greater than or equal to 1; the sending module 902 is used to send the preambles by using the M target RO resources.

Optionally, each of the N RO resources corresponds to an LBT frequency band.

Optionally, the terminal device further includes: a receiving module used to receive the CFRA resource configuration sent by the network side device before the LBT operations are performed on the LBT frequency bands corresponding to the N RO resources; the N RO resources include the RO resources corresponding to the CFRA resource configuration.

Optionally, the N RO resources are N RO resources selected based on the signal qualities of the SSBs or CSI-RSs corresponding to RO resources.

Optionally, the M target RO resources are the M RO resources selected from RO resources at which the simultaneous LBTs are successful, and the RO resources at which the simultaneous LBTs are successful include RO resources at which the end times of the LBT operations are the same and the LBTs are successful, or the RO resources whose start times are the same and at which the LBTs are successful, or the RO resources at which the start times of the LBT operations are the same and the LBTs are successful.

Optionally, the M target RO resources are the M RO resources selected from the RO resources at which the LBTs are successful based on the signal qualities of the SSBs or CSI-RSs corresponding to the RO resources at which the LBTs are successful; or the M target RO resources are selected from the RO resources at which the LBTs are successful, based on the priorities corresponding to the RO resources at which the LBTs are successful.

Optionally, the rule of the priorities of the RO resources includes: the rule that the priority of the RO resource of the first type is higher than the priority of the RO resource of the second type; and/or the rule that the higher the signal quality of the SSB or CSI-RS corresponding to the RO resource in the RO resources of the same type is, the higher the priority of the RO resource is.

The RO resource of the first type is the RO resource corresponding to the CFRA resource configuration, and the RO resource of the second type is the RO resource corresponding to the CBRA resource configuration.

Optionally, the N RO resources all belong to the same cell, or the N RO resources belong to at least two cells.

Optionally, the N RO resources all belong to the same BWP, or the N RO resources belong to at least two BWPs.

Optionally, the selection module is used to: perform the LBT operations on the LBT frequency bands corresponding to the N RO resources until the M target RO resources are selected from the N RO resources, and abandon LBT operations that have not yet been performed at RO resources in the N RO resources.

Optionally, the N RO resources are the N RO resources determined by the MAC layer of the terminal device; the selection module includes the PHY layer of the terminal device, and the PHY layer is used to: perform the LBT operations on the LBT frequency bands corresponding to the N RO resources, and select the M target RO resources from the N RO resources.

Optionally, the MAC layer is further used to: send the first notification information to the PHY layer before the PHY layer of the terminal device performs the LBT operations on the LBT frequency bands corresponding to the N RO resources and selects the M target RO resource(s) from the N RO resources, and the first notification information includes the identity information corresponding to each of the N RO resources and/or the rule of the priorities of the RO resources that is configured by the MAC layer.

Optionally, the PHY layer is further used to send the second notification information to the MAC layer, after the PHY layer of the terminal device performs the LBT operations on the LBT frequency bands corresponding to the N RO resources and selects the M target RO resources from the N RO resources, and the second notification information includes the identity information of the M target RO resources.

Optionally, the terminal device further includes a power control module, and the power control module is specifically used to: perform the power ramping operation after the preambles are sent by using the M target RO resources, in the case where it is determined that the preamble needs to be resent, if the selected RO resource for resending the preamble and the target RO resource correspond to the same SSB or CSI-RS; and/or maintain the sending power of the preamble after the preambles are sent by using the M target RO resources, if the selected RO resource for resending the preamble and the target RO resource correspond to different SSBs or CSI-RSs.

The terminal device 900 provided by some embodiments of the present disclosure can implement the process implemented by the terminal device in the method embodiments in FIG. 6, and details are not repeated herein to avoid repetition.

The selection module 901 of the terminal device 900 in some embodiments of the present disclosure is used to perform the LBT operations on the LBT frequency bands corresponding to the N RO resources, and to select the M target RO resources from the N RO resources. At least two RO resources in the N RO resources correspond to different LBT frequency bands, and the target RO resources are the RO resources in the N RO resources at which the LBTs are successful, N is an integer greater than 1, and M is an integer less than or equal to N and greater than or equal to 1. The sending module 902 is used to send the preambles by using the M target RO resources. Since there are at least two RO resources corresponding to different LBT frequency bands, the probability of successes of the LBTs may be increased, and the probability of a delay sending of Msg1 in the random access procedure may be reduced.

Figure 10:
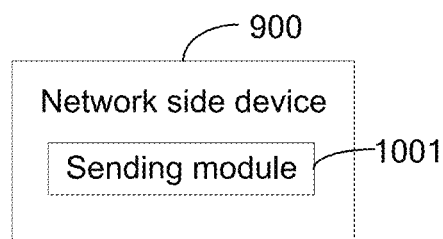
FIG. 10 is a structural diagram of a network side device, in accordance with embodiments of the present disclosure.

Referring to FIG. 10, FIG. 10 is a structural diagram of a network side device, in accordance with some embodiments of the present disclosure. As shown in FIG. 10, the network side device 1000 includes a sending module 1001, the sending module 1001 is used to send the CFRA resource configuration to the terminal device, and the CFRA resource configuration includes one or at least two RO resources.

The network side device 1000 provided by some embodiments of the present disclosure can implement the process implemented by the network side device in the method embodiments in FIG. 8, and details are not repeated herein to avoid repetition.

The sending module 1001 of the network side device 1000 in some embodiments of the present disclosure is used to send the CFRA resource configuration to the terminal device. The CFRA resource configuration includes one or at least two RO resources, which may reduce the probability of collision between the terminal devices in the random access procedure and the probability of failure of the random access.

Figure 11:
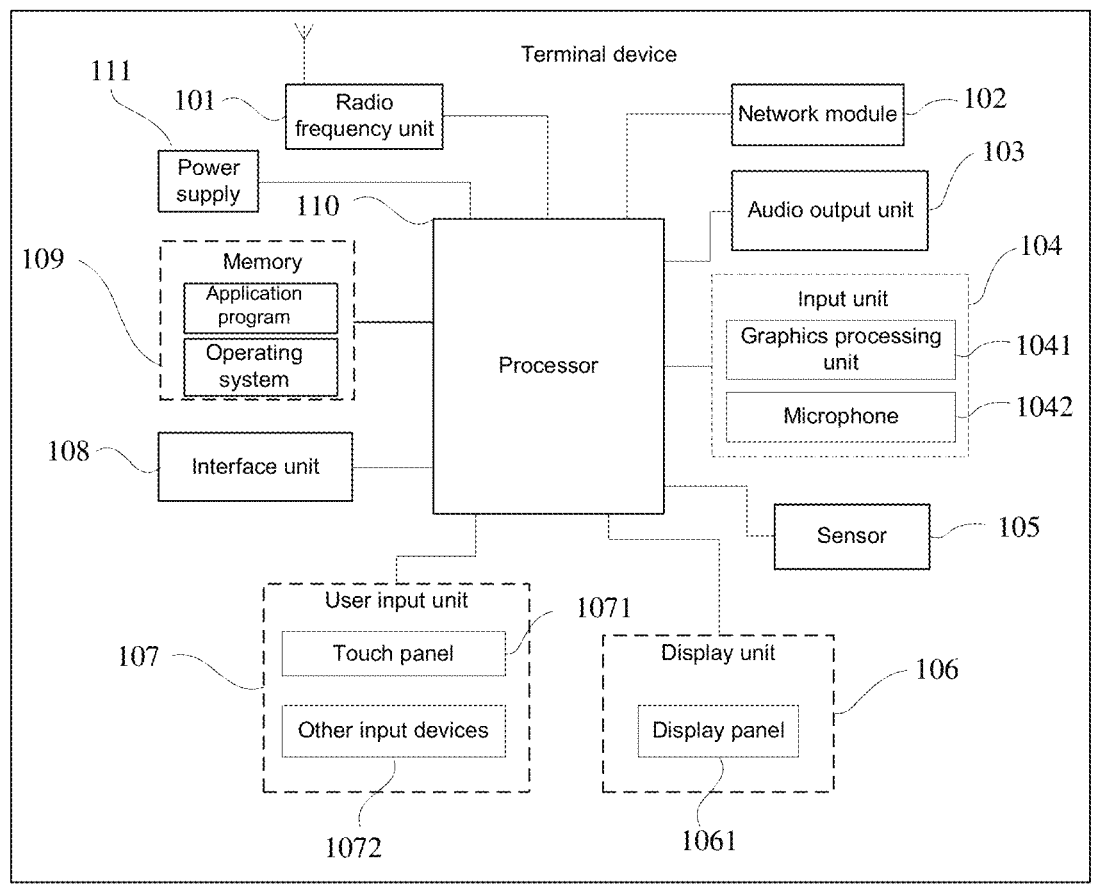
FIG. 11 is a schematic diagram showing a hardware structure of a terminal device for implementing some embodiments of the present disclosure.

FIG. 11 is a schematic diagram showing a hardware structure of a terminal device for implementing the embodiments of the present disclosure. Referring to FIG. 11, the terminal device 1100 includes, but is not limited to, a radio frequency unit 1101, a network module 1102, an audio output unit 1103, an input unit 1104, a sensor 1105, a display unit 1106, a user input unit 1107, an interface unit 1108, a memory 1109, a processor 1110, and a power supply 1111. A person skilled in the art will understand that, the structure of the terminal device shown in FIG. 11 does not constitute a limitation on the terminal device, and the terminal device may include more or fewer components than those shown in the figure, or a combination of certain components, or components with different arrangements. In some embodiments of the present disclosure, the terminal devices include, but are not limited to, a mobile phone, a tablet computer, a notebook computer, a palm computer, a vehicle-mounted terminal, a wearable device, and a pedometer.

The processor 1110 is configured to perform the LBT operations on the LBT frequency bands corresponding to the N RO resources, and to select the M target RO resources from the N RO resources. At least two RO resources in the N RO resources are corresponding to different LBT frequency bands, the target RO resources are the RO resources in the N RO resources at which the LBTs are successful, N is an integer greater than 1, and M is an integer less than or equal to N and greater than or equal to 1; the radio frequency unit 1101 is configured to send the preambles by using the M target RO resources.

In some embodiments of the present disclosure, since there are at least two RO resources corresponding to different LBT frequency bands, the probability of successes of the LBTs may be increased, and the probability of a delay sending of Msg1 in the random access procedure may be reduced.

Optionally, each of the N RO resources corresponds to a different LBT frequency band.

Optionally, the radio frequency unit 1101 is further configured to: receive the CFRA resource configuration sent by the network side device, before the LBT operations are performed on the LBT frequency bands corresponding to the N RO resources; the N RO resources include the RO resources corresponding to the CFRA resource configuration.

Optionally, the N RO resources are the N RO resources selected based on the signal qualities of the SSBs or CSI-RSs corresponding to the RO resources.

Optionally, the M target RO resources are the M target RO resources selected from the RO resources at which the simultaneous LBTs are successful. The RO resources at which the simultaneous LBTs are successful include the RO resources at which the end times of the LBT operations are the same and the LBTs are successful, or the RO resources whose start times are the same and at which the LBTs are successful, or the RO resources at which the start times of the LBT operations are the same and the LBTs are successful.

Optionally, the M target RO resources are the M RO resources selected from the RO resources at which the LBTs are successful, based on the signal qualities of the SSBs or CSI-RSs corresponding to the RO resources at which the LBTs are successful; or the M target RO resources are the M RO resources selected from the RO resources at which the LBTs are successful, based on the priorities corresponding to the RO resources at which the LBTs are successful.

Optionally, the rule of the priorities of the RO resources includes: the rule that the priority of the RO resource of the first type is higher than the priority of the RO resource of the second type; and/or the rule that the higher the signal quality of the SSB or CSI-RS corresponding to the RO resource in the RO resources of the same type is, the higher the priority of the RO resource is; the RO resource of the first type is the RO resource corresponding to the CFRA resource configuration, and the RO resource of the second type is the RO resource corresponding to the CBRA resource configuration.

Optionally, the N RO resources all belong to the same cell, or the N RO resources belong to at least two cells.

Optionally, the N RO resources all belong to the same BWP, or the N RO resources belong to at least two BWPs.

Optionally, the processor 1110 is further configured to perform the LBT operations on the LBT frequency bands corresponding to the N RO resources until the M target RO resources are selected from the N RO resources, and abandon LBT operations that have not yet been performed at RO resources in the N RO resources.

Optionally, the N RO resources are the N RO resources determined by the MAC layer of the terminal device.

The processor 1110 is further configured to perform the LBT operations on the LBT frequency bands corresponding to the N RO resources through the PHY layer of the terminal device, and select the M target RO resources from the N RO resources through the PHY layer of the terminal device.

Optionally, the processor 1110 is further configured to send the first notification information to the PHY layer through the MAC layer, before the PHY layer of the terminal device performs the LBT operations on the LBT frequency bands corresponding to the N RO resources and selects the M target RO resources from the N RO resources. The first notification information includes the identity information corresponding to each of the N RO resources and/or the rule of the priorities of the RO resources that is configured by the MAC layer.

Optionally, the processor 1110 is further configured to send the second notification information to the MAC layer through the PHY layer of the terminal device, after the PHY layer performs the LBT operations on the LBT frequency bands corresponding to the N RO resources and selects the M target RO resources from the N RO resources. The second notification information includes the identity information of the M target RO resources.

Optionally, the processor 1110 is further configured to perform the power ramping operation, after the preambles are sent by using the M target RO resources, in the case where it is determined that the preamble needs to be resent, if the selected RO resource for resending the preamble and the target RO resource correspond to the same SSB or CSI-RS; and/or maintain the sending power of the preamble after the preambles are sent by using the M target RO resources, if the selected RO resource for resending the preamble and the target RO resource correspond to different SSBs or CSI-RSs.

It will be understood that, in some embodiments of the present disclosure, the radio frequency unit 1101 may be configured to receive and transmit signals in a process of receiving and sending information or during a call. For example, the radio frequency unit 1101 receives downlink data from a base station and then transmits the downlink data to the processor 1110 to process the data. In addition, the radio frequency unit 1101 transmits uplink data to the base station. In general, the radio frequency unit 1101 includes, but is not limited to, an antenna, at least one amplifier, a transceiver, a coupler, a low noise amplifier, and a duplexer. In addition, the radio frequency unit 1101 may further communicate with a network and other devices through a wireless communication system.

The terminal device provides wireless broadband access to Internet to users through the network module 1102, such as helping the user to send and receive e-mails, to browse web pages, and to access streaming media.

The audio output unit 1103 may convert audio data received by the radio frequency unit 1101 or the network module 1102 or stored in the memory 1109 into audio signals and output the audio signals as sound. Moreover, the audio output unit 1103 may further output audio associated with a specific function performed by the terminal device 1100 (e.g., call signal reception sound and message reception sound). The audio output unit 1103 includes a speaker, a buzzer, and a receiver.

The input unit 1104 is configured to receive audio signals or video signals. The input unit 1104 may include a graphics processing unit (GPU) 11041 and a microphone 11042. The GPU 11041 processes image data of still pictures or videos obtained by an image capture device (e.g., a camera) in a video capture mode or an image capture mode. The processed image frames may be displayed on the display unit 1106. The image frames processed by the GPU 11041 may be stored in the memory 1109 (or other storage media) or sent via the radio frequency unit 1101 or the network module 1102. The microphone 11042 may receive sound and may be capable of processing the sound into audio data. The processed audio data may be converted into a format that may make the processed audio data be transmitted to a mobile communication base station through the radio frequency unit 1101 in a case of a phone call mode.

The terminal device 1100 further includes at least one type of sensor 1105, for example, a light sensor, a motion sensor, and other sensors. For example, the light sensor includes an ambient light sensor and a proximity sensor. The ambient light sensor may adjust brightness of a display panel 11061 according to brightness of the ambient light. The proximity sensor may turn off the display panel 11061 and/or backlight when the terminal device 1100 is moved to an ear. As a type of the motion sensor, an accelerometer sensor may detect magnitudes of accelerations in various directions (generally three axes), and may detect a magnitude and a direction of gravity when the accelerometer sensor is still, and may be used to identify postures of the terminal device (e.g., horizontal-vertical screen switching, related games, and magnetometer posture calibration), and identify related functions (e.g., pedometer and knocking) through vibration. The sensor 1105 may further include a fingerprint sensor, a pressure sensor, an iris sensor, a molecular sensor, a gyroscope, a barometer, a hygrometer, a thermometer, or an infrared sensor, and details are not repeated herein.

The display unit 1106 is configured to display information input by the user or information provided to the user. The display unit 1106 may include the display panel 11061, which may be configured in a form of a liquid crystal display (LCD), organic light-emitting diodes (OLEDs), or the like.

The user input unit 1107 may be configured to receive input digital or character information and generate input key signal related to user settings and function control of the terminal device. Specifically, the user input unit 1107 includes a touch panel 11071 and other input devices 11072. The touch panel 11071, also referred to as a touch screen, may acquire a touch operation by the user on or near the touch panel 11071 (e.g., an operation by the user on or near the touch panel 11071 by using any suitable object or attachment such as a finger and a stylus). The touch panel 11071 may include two portions, i.e., a touch detection device and a touch controller. The touch detection device detects a position touched by the user, and a signal from the touch operation and transmits the signal to the touch controller. The touch controller receives touch information from the touch detection device, converts the touch information into coordinates of a touch point, sends the coordinates of the touch point to the processor 1110, receives a command from the processor 1110, and executes the command. In addition, the touch panel 11071 may be implemented by various types of touch panels such as a resistive touch panel, a capacitive touch panel, an infrared touch panel, and a surface acoustic wave touch panel. The user input unit 1107 may further include other input devices 11072 besides the touch panel 11071. For example, the other input devices 11072 may include, but are not limited to, a physical keyboard, function keys (e.g., volume control keys and an on/off key), a trackball, a mouse, and a joystick, and details are not repeated herein.

Further, the touch panel 11071 may cover the display panel 11061. After the touch panel 11071 detects a touch operation on or near it, the touch panel 11071 sends the touch operation to the processor 1110 to determine a type of the touch event. Then, the processor 1110 provides corresponding visual output on the display panel 11061 according to the type of the touch event. Although in FIG. 11, the touch panel 11071 and the display panel 11061 are used as two separate components to implement an input function and an output function of the terminal device, in some embodiments, the touch panel 11071 may be integrated with the display panel 11061 to implement the input function and the output function of the terminal device, which is not specifically limited herein.

The interface unit 1108 is an interface for connecting an external device to the terminal device 1100. For example, the external device may include a port for wired or wireless headsets, a port for an external power supply (or battery charger), a port for a wired or wireless data, a port for a memory card, a port for connecting a device with an identification module, an audio input/output (I/O) port, a video I/O port, and an earphone port. The interface unit 1108 may be used to receive input from the external device (e.g., data information and power) and transmit the received input to one or more elements of the terminal device 1100, or may be used to transmit data between the terminal device 1100 and the external device.

The memory 1109 may be configured to store software programs and various data. The memory 1109 may mainly include a program storage region and a data storage region. The program storage region may store an operating system and application programs that are required by at least one function (e.g., a sound playing function or an image playing function). The storage data region may store data (e.g., audio data and a phonebook) created according to use of a mobile phone. In addition, the memory 1109 may include a high-speed random access memory, and may further include a non-volatile memory, such as at least one magnetic disk storage device, a flash memory device, or other volatile solid-state storage device.

The processor 1110 is a control center of the terminal device. The processor 1110 is used to connect various parts of the entire terminal device through various interfaces and wires, and realize various functions of the terminal device and process data through running or executing software programs and/or modules stored in the memory 1109 and invoking data stored in the memory 1109, thereby monitoring the terminal device entirely. The processor 1110 may include one or more processing units. Optionally, an application processor and a modem processor may be integrated in the processor 1110. The application processor is mainly responsible for the operating system, user interfaces and application programs, and the modem processor is mainly responsible for wireless communication. It will be understood that, the modem processor may not be integrated in the processor 1110.

The terminal device 1100 may further include the power supply 1111 (e.g., a battery) for supplying power to various components. Optionally, the power supply 1111 may be logically connected to the processor 1110 through a power management system, so that functions such as charging management, discharging management and power consumption management are achieved through the power management system.

In addition, the terminal device 1100 includes some functional modules that are not shown, which will not be repeated herein.

Optionally, some embodiments of the present disclosure further provide a terminal device. The terminal device includes a processor 1110, a memory 1109, and computer programs that are stored in the memory 1109 and may be run on the processor 1110. The computer programs, when executed by the processor 1110, cause the processor to perform the process in the above embodiment of random access method. The terminal device can achieve the same technical effects as the random access method, and details are not repeated herein to avoid repetition.

Some embodiments of the present disclosure further provide a non-transitory computer-readable storage medium. The non-transitory computer-readable storage medium stores computer programs that, when executed by a processor, cause the processor to perform the process in the above embodiment of random access method. The non-transitory computer-readable storage medium can achieve the same technical effects as the random access method, and details are not repeated herein to avoid repetition. The computer-readable storage medium may be, for example, a read-only memory (abbreviated as ROM), a random access memory (abbreviated as RAM), a magnetic disk, or an optical disk.

Figure 12:
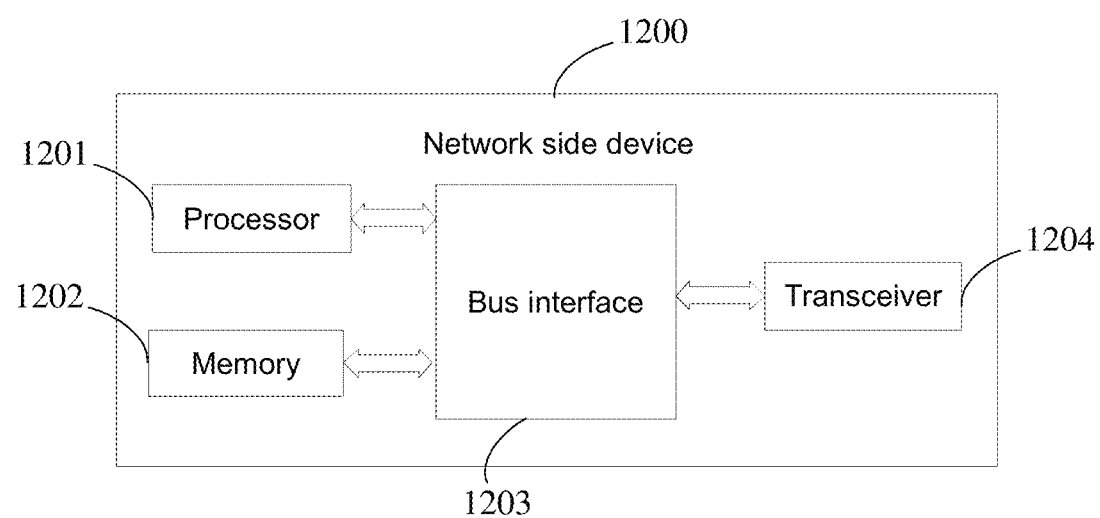
FIG. 12 is a structural diagram of a network side device, in accordance with some embodiments of the present disclosure.

Referring to FIG. 12, FIG. 12 is a structural diagram of a network side device according to another embodiment of the present disclosure, and the network side device may be a source node or a target node. As shown in FIG. 12, the network side device 1200 includes a processor 1201, a memory 1202, a bus interface 1203, and a transceiver 1204. The processor 1201, the memory 1202, and the transceiver 1204 are all connected to the bus interface 1203. The transceiver 1204 is configured to transmit a non-contention random access, CFRA, resource configuration to a terminal device, wherein the CFRA resource configuration includes one or at least two physical random access channel RO resources.

In some embodiments of the present disclosure, the network side device 1200 further includes computer programs that are stored in the memory 1202 and may be run on the processor 1201. The computer programs, when executed by the processor 1201, cause the processor 1201 to perform the following step:

sending the CFRA resource configuration to the terminal device, the CFRA resource configuration including one or at least two RO resources.

Some embodiments of the present disclosure further provide a network side device. The network side device includes a processor 1201, a memory 1202, and computer programs that are stored in the memory 1202 and may be run on the processor 1201. The computer programs, when executed by the processor 1201, cause the processor 1201 to perform the process in the above embodiment of random access method. The network side device can achieve the same technical effects as the random access method, and details are not repeated herein to avoid repetition.

Some embodiments of the present disclosure further provide a non-transitory computer-readable storage medium.

The non-transitory computer-readable storage medium stores computer programs that, when executed by a processor, cause the processor to perform the process in the above embodiment of random access method. The non-transitory computer-readable storage medium can achieve the same technical effects as the random access method, and details are not repeated herein to avoid repetition. The computer-readable storage medium may be, for example, a read-only memory (abbreviated as ROM), a random access memory (abbreviated as RAM), a magnetic disk, or an optical disk.

It will be noted that, the terms such as "comprise" and "include" or any other variants thereof herein are intended to cover non-exclusive inclusion, so that a process, a method, an article or a device that includes a series of elements not only includes those elements, but also includes other elements not explicitly listed, or includes elements inherent to the process, the method, the article or the device. In a case where there is no more limitation, an element defined by the phrase "including a . . . " does not exclude existence of other identical elements in a process, a method, an article or a device that includes the element.

Through the description of the above embodiments, a person skilled in the art will clearly understand that, the method in the above embodiment may be performed by means of software and a necessary general-purpose hardware platform. The method may further be performed through hardware, but in many cases, the former is a better implementation. On a basis of such understanding, the technical solution in the present disclosure essentially or a part contributing to the prior art may be embodied in a form of a software product. The computer software product is stored in a storage medium (e.g., a ROM/RAM, a diskette, or an optical disk), and includes some instructions that cause a terminal (which may be a mobile phone, a computer, a server, an air conditioner, or a network side device) to perform the method described in the embodiments of the present disclosure.

Some embodiments of the present disclosure are described above with reference to the accompanying drawings. However, the present disclosure is not limited to the above specific embodiments. The above specific embodiments are merely examples and are not restrictive. Under enlightenment of the present disclosure, a person of ordinary skill in the art may make a plurality of forms without departing from spirit of the present disclosure and the protection scope of the claims, all of which fall within the protection scope of the present disclosure.

What is claimed is:

1. A random access method, performed by a terminal device, the method comprising:
   performing listen before talk (LBT) operations on LBT frequency bands corresponding to N physical random access channel occasion (RO) resources, wherein at least two RO resources in the N RO resources are corresponding to different LBT frequency bands, and N is an integer greater than 1;
   selecting M target RO resources from the N RO resources, wherein the target RO resources are RO resources in the N RO resources at which LBTs are successful and M is an integer less than or equal to N and greater than or equal to 1; and
   sending preambles by using the M target RO resources;
   wherein the M target RO resources are selected from RO resources at which simultaneous LBTs are successful, and the RO resources at which the simultaneous LBTs are successful include RO resources whose start times are the same and at which LBTs are successful;
   wherein each of the N RO resources corresponds to a different LBT frequency band;
   wherein the M target RO resources are selected, based on priorities corresponding to RO resources at which LBTs are successful, from the RO resources at which LBTs are successful; wherein a rule of the priorities of the RO resources includes:
   a rule that a priority of a RO resource of a first type is higher than a priority of a RO resource of a second type; or
   another rule that the higher a signal quality of an SSB or a CSI-RS corresponding to a RO resource in RO resources of a same type is, the higher a priority of the RO resource is, wherein
   the RO resource of the first type is a RO resource included in a contention-free random access (CFRA) resource configuration, and the RO resource of the second type is a RO resource included in a contention based random access (CBRA) resource configuration.

2. The method according to claim 1, wherein the N RO resources all belong to a same cell, or the N RO resources belong to at least two cells; or
   the N RO resources all belong to a same bandwidth part (BWP), or the N RO resources belong to at least two BWPs.

3. The method according to claim 1, wherein performing the LBT operations on the LBT frequency bands corresponding to the N RO resources and selecting the M target RO resources from the N RO resources include:
   performing the LBT operations on the LBT frequency bands corresponding to the N RO resources until the M target RO resources are selected from the N RO resources, and
   abandoning the LBT operations at RO resources in the N RO resource that have not yet been performed.

4. The method according to claim 1, wherein the N RO resources are N RO resources determined by a media access control (MAC) layer of the terminal device; and
   performing the LBT operations on the LBT frequency bands corresponding to the N RO resources and selecting the M target RO resources from the N RO resources include:
   performing, by a physical (PHY) layer of the terminal device, the LBT operations on the LBT frequency bands corresponding to the N RO resources, and
   selecting, by the PHY layer, the M target RO resources from the N RO resources.

5. The method according to claim 4, wherein before the PHY layer of the terminal device performs the LBT operations on the LBT frequency bands corresponding to the N RO resources and selects the M target RO resources from the N RO resources, the method further comprises:
   sending, by the MAC layer, first notification information to the PHY layer, wherein the first notification information includes identity information corresponding to each of the N RO resources and/or a rule of priorities of RO resources that is configured by the MAC layer.

6. The method according to claim 4, wherein after the PHY layer of the terminal device performs the LBT operations on the LBT frequency bands corresponding to the N RO resources and selects the M target RO resources from the N RO resources, the method further comprises:
   sending, by the PHY layer, second notification information to the MAC layer, wherein the second notification information includes identity information of the M target RO resources.

7. The method according to claim 1, wherein after sending the preambles by using the M target RO resources, the method further comprises:
  in a case where it is determined that a preamble needs to be resent, if a selected RO resource for resending the preamble and a target RO resource correspond to a same synchronization signal block (SSB) or channel state information reference signal (CSI-RS), performing a power ramping operation; and/or
  if the selected RO resource for resending the preamble and the target RO resource correspond to different SSBs or CSI-RSs, maintaining a sending power of the preamble.

8. The method according to claim 1, wherein before performing the LBT operations on the LBT frequency bands corresponding to the N RO resources, the method further comprises:
  receiving a contention-free random access (CFRA) resource configuration sent by a network side device, wherein
  the N RO resources include RO resources included in the CFRA resource configuration.

9. A terminal device, comprising:
  a processor configured to perform listen before talk (LBT) operations on LBT frequency bands corresponding to N physical random access channel occasion (RO) resources, and select M target RO resources from the N RO resources, wherein at least two RO resources in the N RO resources are corresponding to different LBT frequency bands, the target RO resources are RO resources in the N RO resources on which LBTs are successful, N is an integer greater than 1, and M is an integer less than or equal to N and greater than or equal to 1; and
  a radio frequency unit configured to send preambles by using the M target RO resources;
  wherein the M target RO resources are selected from RO resources at which simultaneous LBTs are successful, and the RO resources at which the simultaneous LBTs are successful include RO resources whose start times are the same and at which LBTs are successful;
  wherein each of the N RO resources corresponds to a different LBT frequency band;
  wherein the M target RO resources are selected, based on priorities corresponding to the RO resources at which the simultaneous LBTs are successful, from the RO resources at which the simultaneous LBTs are successful;
  wherein a rule of the priorities of the RO resources includes:
  a rule that a priority of a RO resource of a first type is higher than a priority of a RO resource of a second type; or
  another rule that the higher a signal quality of an SSB or a CSI-RS corresponding to a RO resource in RO resources of a same type is, the higher a priority of the RO resource is; and wherein the RO resource of the first type is a RO resource included in a contention-free random access (CFRA) resource configuration, and the RO resource of the second type is a RO resource included in a contention based random access (CBRA) resource configuration.

10. The terminal device according to claim 9, wherein the N RO resources are N RO resources determined by a media access control (MAC) layer of the terminal device; and
  the processor includes a physical (PHY) layer of the terminal device, and the PHY layer is configured to:
  perform the LBT operations on the LBT frequency bands corresponding to the N RO resources, and select the M target RO resources from the N RO resources.

11. The terminal device according to claim 10, wherein the MAC layer is further configured to:
  send first notification information to the PHY layer before the PHY layer of the terminal device performs the LBT operations on the LBT frequency bands corresponding to the N RO resources and select the M target RO resources from the N RO resources, wherein the first notification information includes identity information corresponding to each of the N RO resources and/or a rule of priorities of RO resources that is configured by the MAC layer.

12. The terminal device according to claim 10, wherein after the PHY layer of the terminal device performs the LBT operations on the LBT frequency bands corresponding to the N RO resources and selects the M target RO resources from the N RO resources, the radio frequency unit is further configured to:
  send, by the PHY layer, second notification information to the MAC layer, wherein the second notification information includes identity information of the M target RO resources.

13. The terminal device according to claim 9, wherein the processor is further configured to:
  receive a contention-free random access (CFRA) resource configuration sent by a network side device, wherein
  the N RO resources include RO resources included in the CFRA resource configuration.

14. The terminal device according to claim 9, wherein the N RO resources all belong to a same cell, or the N RO resources belong to at least two cells; or
  the N RO resources all belong to a same bandwidth part (BWP), or the N RO resources belong to at least two BWPs.

15. The terminal device according to claim 9, wherein the processor is configured to:
  perform the LBT operations on the LBT frequency bands corresponding to the N RO resources until the M target RO resources are selected from the N RO resources, and
  abandon the LBT operations at RO resources in the N RO resource that have not yet been performed.

16. The terminal device according to claim 9, wherein after sending the preambles by using the M target RO resources, the processor is further configured to:
  in a case where it is determined that a preamble needs to be resent, if a selected RO resource for resending the preamble and a target RO resource correspond to a same synchronization signal block (SSB) or channel state information reference signal (CSI-RS), perform a power ramping operation; and/or
  if the selected RO resource for resending the preamble and the target RO resource correspond to different SSBs or CSI-RSs, maintain a sending power of the preamble.

17. A non-transitory computer-readable storage medium, wherein the non-transitory computer-readable storage medium stores a program, and the program, when executed by a processor of a terminal device, causes the terminal device to perform:
  performing listen before talk (LBT) operations on LBT frequency bands corresponding to N physical random access channel occasion (RO) resources, wherein at least two RO resources in the N RO resources are corresponding to different LBT frequency bands, and N is an integer greater than 1;

selecting M target RO resources from the N RO resources, wherein the target RO resources are RO resources in the N RO resources at which LBTs are successful and M is an integer less than or equal to N and greater than or equal to 1; and sending preambles by using the M target RO resources;

wherein the M target RO resources are selected from RO resources at which simultaneous LBTs are successful, and the RO resources at which the simultaneous LBTs are successful include RO resources whose start times are the same and at which LBTs are successful;

wherein each of the N RO resources corresponds to a different LBT frequency band;

wherein the M target RO resources are selected, based on priorities corresponding to the RO resources at which the simultaneous LBTs are successful, from the RO resources at which the simultaneous LBTs are successful;

wherein a rule of the priorities of the RO resources includes:

a rule that a priority of a RO resource of a first type is higher than a priority of a RO resource of a second type; or another rule that the higher a signal quality of an SSB or a CSI-RS corresponding to a RO resource in RO resources of a same type is, the higher a priority of the RO resource is; and wherein the RO resource of the first type is a RO resource included in a contention-free random access (CFRA) resource configuration, and the RO resource of the second type is a RO resource included in a contention based random access (CBRA) resource configuration.

18. The non-transitory computer-readable storage medium according to claim 17, wherein the processor is further configured to:

receive a contention-free random access (CFRA) resource configuration sent by a network side device, wherein the N RO resources include RO resources included in the CFRA resource configuration.

19. The non-transitory computer-readable storage medium according to claim 17, wherein the N RO resources all belong to a same cell, or the N RO resources belong to at least two cells; or the N RO resources all belong to a same bandwidth part (BWP), or the N RO resources belong to at least two BWPs.

20. The non-transitory computer-readable storage medium according to claim 17, wherein the processor is configured to:

perform the LBT operations on the LBT frequency bands corresponding to the N RO resources until the M target RO resources are selected from the N RO resources, and abandon the LBT operations at RO resources in the N RO resource that have not yet been performed.

* * * * *